US012700803B2

(12) United States Patent
Wu

(10) Patent No.: US 12,700,803 B2
(45) Date of Patent: Aug. 4, 2026

(54) SYSTEM AND METHOD TO BOOST LIGHT LOAD EFFICIENCY FOR MULTIPHASE CONVERTERS

(71) Applicant: Reed Semiconductor Corporation, Warwick, RI (US)

(72) Inventor: Wenkai Wu, East Greenwich, RI (US)

(73) Assignee: Reed Semiconductor Corporation, Warwick, RI (US)

( * ) Notice: Subject to any disclaimer, the term of this patent is extended or adjusted under 35 U.S.C. 154(b) by 0 days.

(21) Appl. No.: 17/456,676

(22) Filed: Nov. 29, 2021

(65) Prior Publication Data

US 2022/0294352 A1      Sep. 15, 2022

Related U.S. Application Data

(60) Provisional application No. 63/200,533, filed on Mar. 12, 2021.

(51) Int. Cl.
*H02M 3/158*      (2006.01)
*H02M 1/00*      (2006.01)

(52) U.S. Cl.
CPC ....... *H02M 3/1584* (2013.01); *H02M 1/0032* (2021.05); *H02M 1/0045* (2021.05); *H02M 3/1586* (2021.05)

(58) Field of Classification Search
CPC ............. H02M 1/0032; H02M 3/1584; H02M 3/1586; H02M 1/0045
See application file for complete search history.

(56) References Cited

U.S. PATENT DOCUMENTS

| | | | | |
|---|---|---|---|---|
| 2013/0214751 A1* | 8/2013 | Shiraishi | ............. | H02M 3/1584 323/272 |
| 2015/0303799 A1* | 10/2015 | Tang | ................... | H02M 3/1584 323/271 |
| 2016/0233766 A1* | 8/2016 | Todorov | .............. | H02M 3/1584 |
| 2020/0366203 A1* | 11/2020 | Mei | ..................... | H02M 3/1584 |
| 2021/0119532 A1* | 4/2021 | Zou | ..................... | H02M 1/0025 |

* cited by examiner

*Primary Examiner* — Alex Torres-Rivera
(74) *Attorney, Agent, or Firm* — AP3 Law Firm PLLC

(57)      ABSTRACT

A method for boosting light load efficiency for multiphase converters through disabling at least partially a current sense circuit, disabling partial equivalent elements of one of power stages, using small size equivalent element for one of power stages, and through utilizing higher inductance, compared to other regular phases, to reduce RMS current.

13 Claims, 7 Drawing Sheets

SYSTEM AND METHOD TO BOOST LIGHT LOAD EFFICIENCY FOR MULTIPHASE CONVERTERS

CROSS-REFERENCE TO RELATED APPLICATION

This application claims the benefit of priority of U.S. provisional application No. 63/200,533, filed 12 Mar. 2021, the contents of which are herein incorporated by reference.

BACKGROUND OF THE INVENTION

The present invention relates to multiphase converters and, more particularly, systems and method for boosting light load efficiency for multiphase converters.

Quiescent current is critical for battery powered applications. Current multiphase converters for portable applications require current sense circuitry to manage the voltage regulator and system power. Current sense circuitry, however, consumes high current during a light load.

As can be seen, there is a need for a method and system for boosting light load efficiency for multiphase converters. To save the power consumption under light load condition, the present invention disables, either entirely or partially, the current sense circuitry or equivalent elements of one of the power stages in multiphase system. Also, the present invention contemplates using small size power stage for one phase in multiphase system. In addition, the present invention contemplates using higher inductance, compared to other regular phases, to reduce the RMS current to further boost light load efficiency.

SUMMARY OF THE INVENTION

In one aspect of the present invention, a method of saving power consumption of a multiphase converter under light load conditions, the multiphase converter having a plurality of power stages, each stage with a current sense circuitry, the method including disabling at least partially a current sense circuitry of one or the power stages of the plurality of power stages.

In another aspect of present invention, a method of reduce power consumption of a multiphase converter under light load conditions, the multiphase converter having a plurality of power stages, each stage with a current sense/feedback circuitry, the method including using a small size equivalent element for one of power stages of the plurality of power stages.

In yet another aspect of the present invention, a method of boosting boost light load efficiency for a multiphase converter includes utilizing higher inductance, compared to other regular phases, to reduce RMS current.

In still yet another aspect of the present invention, A multiphase power converter includes a power management circuitry having a driver output; the power management circuitry operatively associated with a first power stage in parallel with one or more second power stages, said power stages coupled to an output, each of the power stages having a current sense circuit coupled to the driver output, and configured to generate a feedback signal based on the driver output and only upon receiving an enable signal; an inductor; and a stage selection circuit configured to generate the enable signal to each of the first power stage and the one or more second power stages in each of a plurality of phases, wherein in a light load condition, the enable signal is not sent to the current sense circuit of the first power stage, wherein the inductor associated with the first power stage has an inductance substantially less than the inductor of each of the one or more second power stages, wherein said inductance is between one-fifth and one-quarter of an inductance of the inductor of each of the one or more second power stages, wherein the power management circuitry is a voltage regulator controller, and wherein the voltage regulator controller comprising a source only voltage regulator operatively associated with only the first power stage.

These and other features, aspects and advantages of the present invention will become better understood with reference to the following drawings, description and claims.

DETAILED DESCRIPTION OF THE INVENTION

The following detailed description is of the best currently contemplated modes of carrying out exemplary embodiments of the invention. The description is not to be taken in a limiting sense, but is made merely for the purpose of illustrating the general principles of the invention, since the scope of the invention is best defined by the appended claims.

Figure 1:
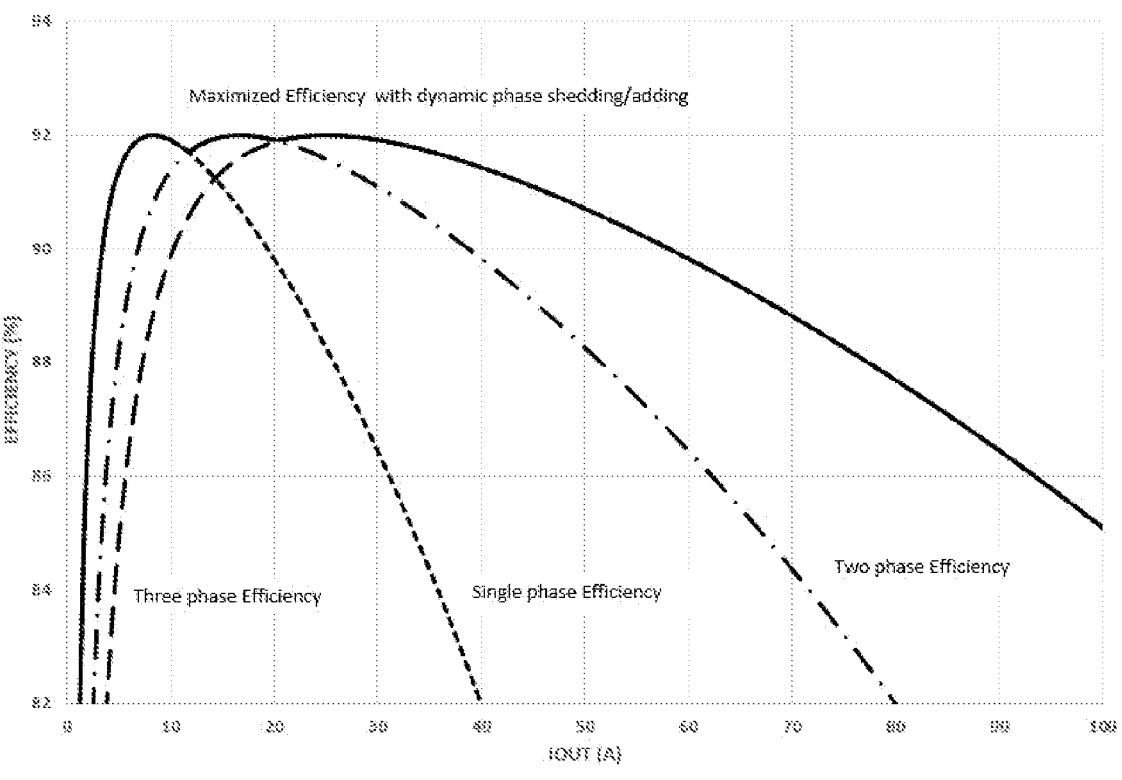
FIG. 1 is a graph of prior art multiphase converter efficiency.
Figure 2:
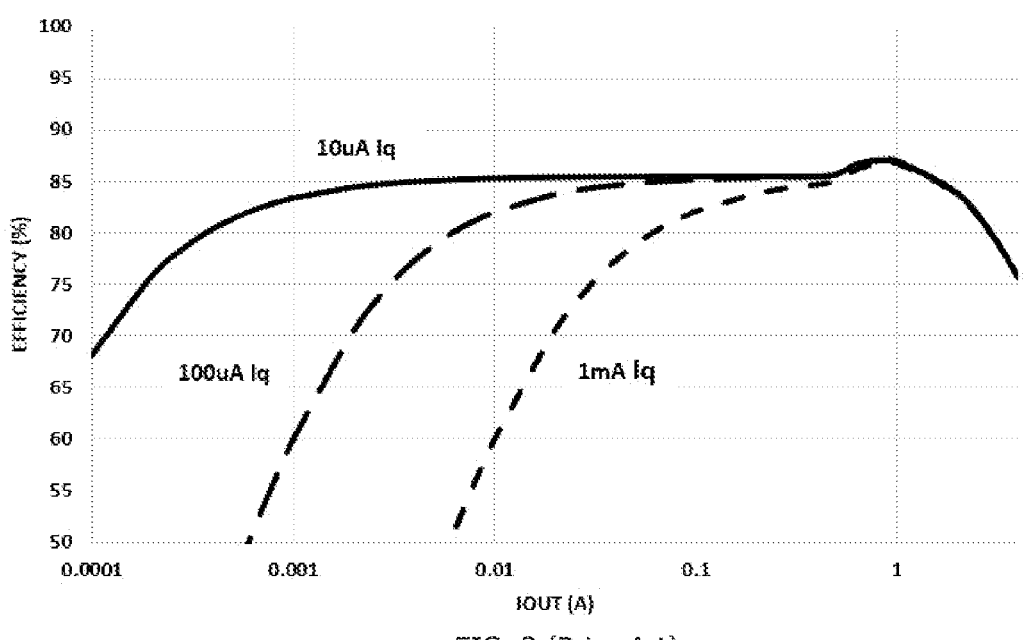
FIG. 2 is a graph of quiescent current on light load efficiency.
Figure 3:
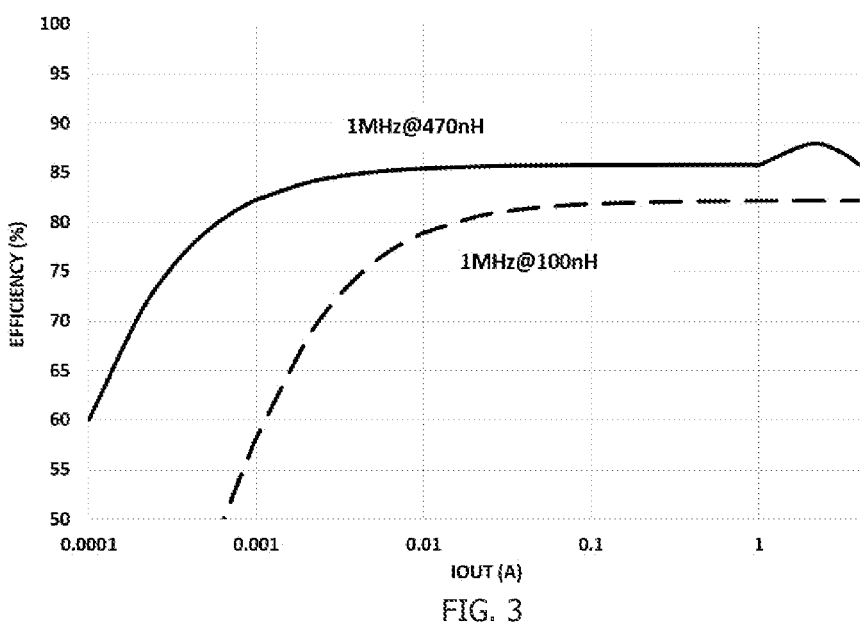
FIG. 3 is a graph of light load efficiency boost for multiphase converters with higher inductance and disable current sense to reduce quiescent current.
Figure 4:
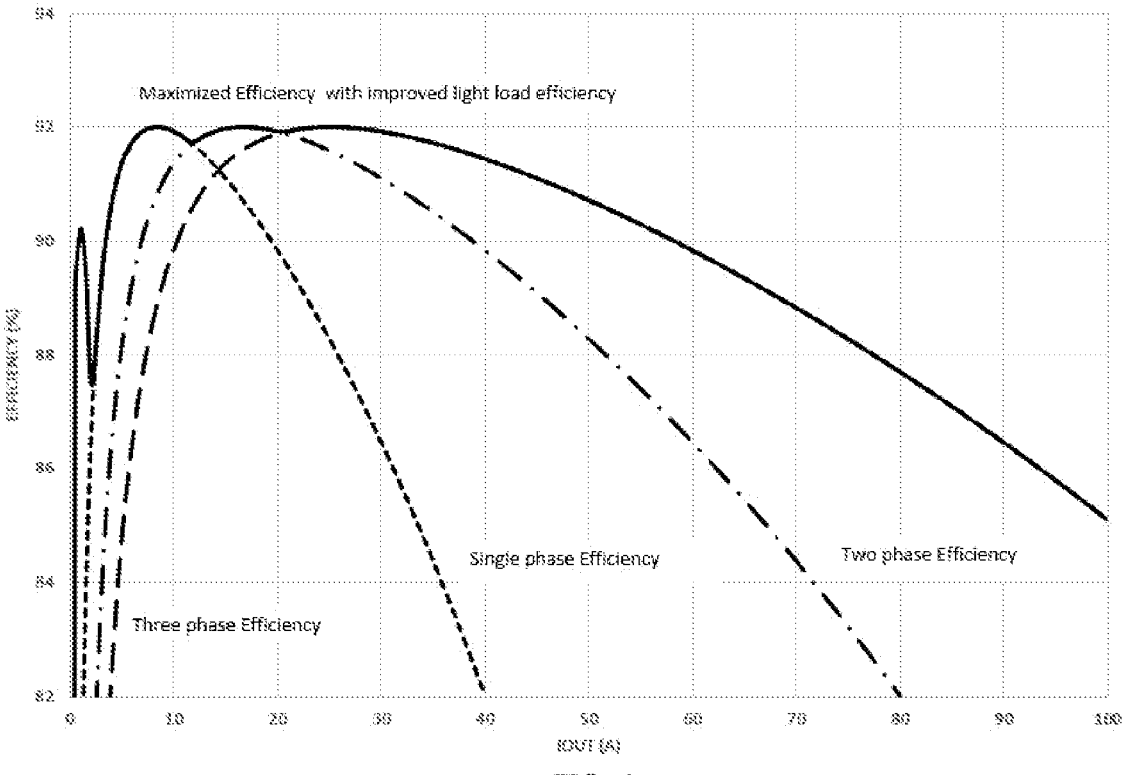
FIG. 4 is a graph of multiphase efficiency with improved light load efficiency.
Figure 5:
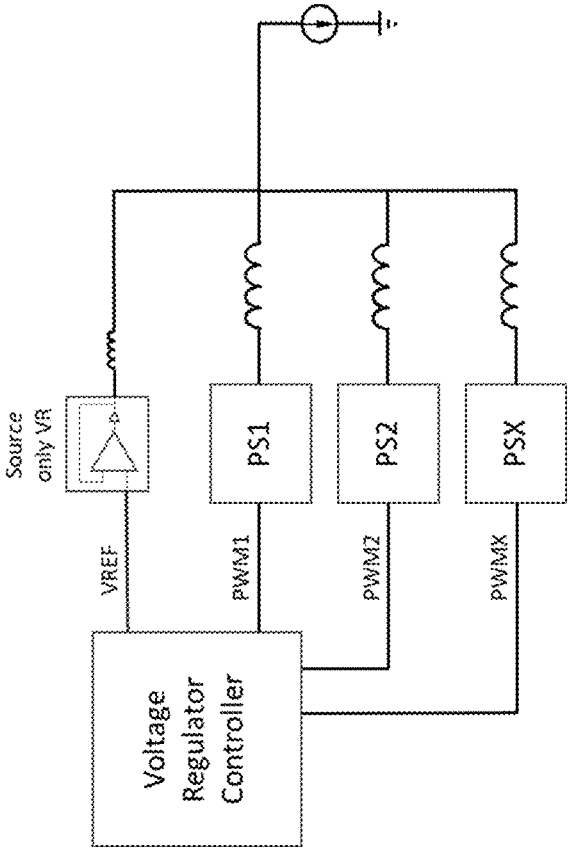
FIG. 5 is a schematic view of an exemplary embodiment an external voltage regulator configuration of the present invention, illustrating source-only voltage regulator (VR) tracking VREF, wherein source-only VR will boost light load efficiency due to its extremely low quiescent current capability, wherein a controller will provide VREF to ensure the proper sequence and power allocation for source only VR and other regular phases, wherein source-only VR is self-regulated voltage regulator with build-in output current limit, wherein source-only VR regulated voltage normally, though not necessarily, is lower than main voltage regulator, and wherein although source only VR has self-protection, main voltage regulator supervises output voltage, current, temperature and all regulator faults.
Figure 6:
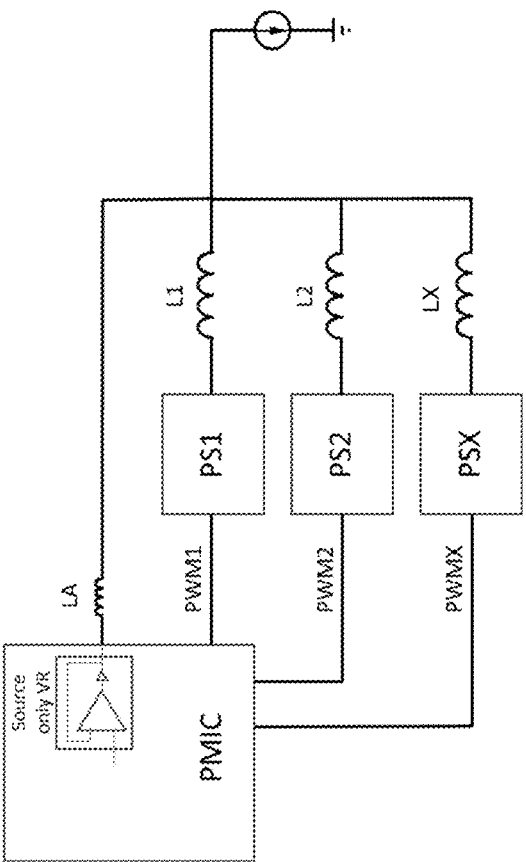
FIG. 6 is a schematic view of an exemplary embodiment of an auxiliary voltage regulator configuration of the present invention (within the package to address light load efficiency), wherein the source-only voltage regulator (VR) is moved inside of the package of power management integrated circuit (PMIC), which may be either a separate die co-packaged with the main voltage regulator controller die; or on the same die as main voltage regulator controller.
Figure 7:
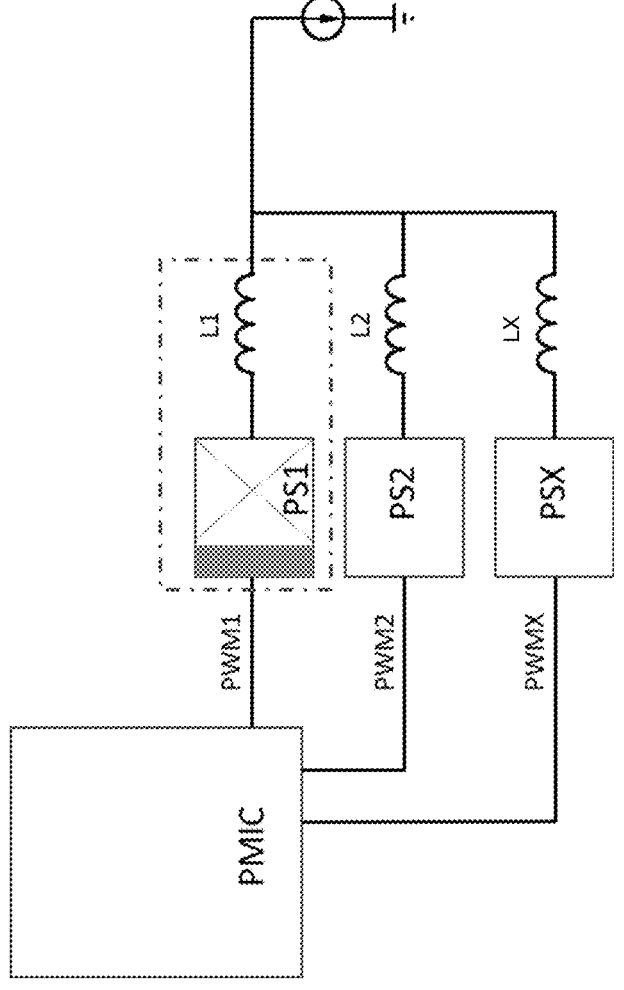
FIG. 7 is a schematic view of an exemplary embodiment of the present invention, illustrating wherein a partial MOSFET is turned off and current sense is turned off in light load to boost the light load efficiency, wherein one of power-stages with current sense, as shown in FIG. 7, is used to improve the light load efficiency, wherein only partial MOSFET cells are used to work under light load, and wherein current sense circuits inside of the power-stage are shutdown to reduce the quiescent current, only needed circuits such as protection are keep running in the light load mode.
Figure 8:
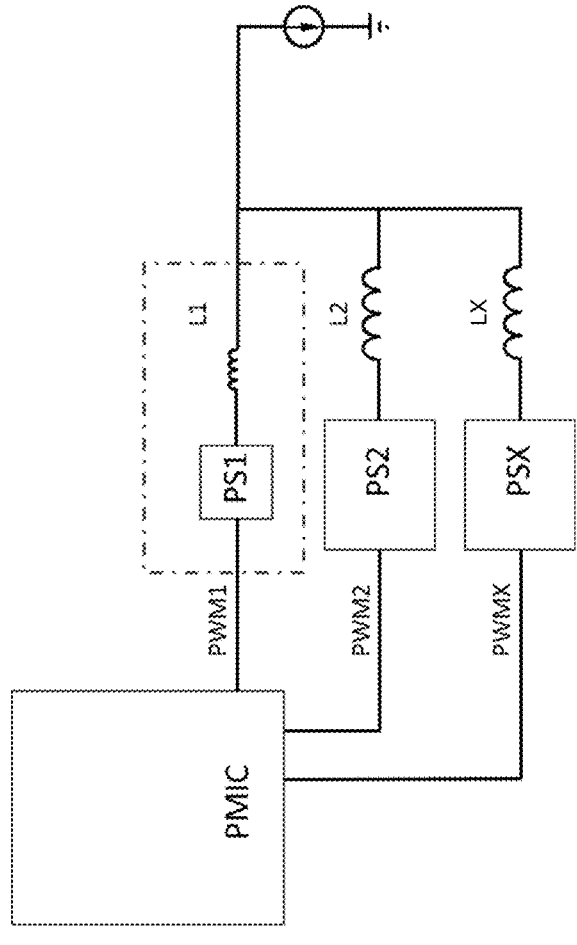
FIG. 8 is a schematic view of an exemplary embodiment of the present invention, illustrating wherein a power-stage with smaller MOSFETs is used to boost the light load efficiency, wherein the smaller power-stage is dedicated to address light load efficiency in such a way that higher inductance with smaller size inductor could be used; and therefore no IMON and/or TMON (which consumes current) is needed for this small power-stage; and as a result no current sense circuits is needed for PMIC to do load-line or current monitoring. Minimum circuits such as protection are active to minimize the quiescent current in the light load mode.
Figure 9:
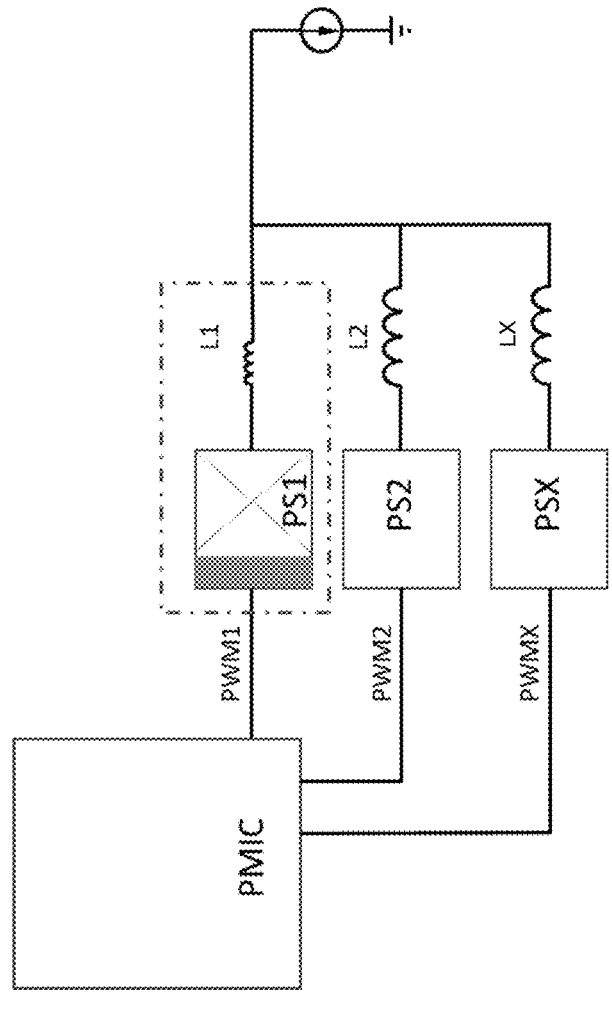
FIG. 9 is a schematic view of an exemplary embodiment of the present invention, illustrating wherein a partial MOS-FET is turned off, current sense is turned off, and utilization of an inductor with higher inductance in light load to boost the light load efficiency, wherein one of the power-stages with current sense, as shown, is used to improve the light load efficiency, wherein only partial MOSFET cells are used to work under light load, and wherein current sense circuits inside of the power-stage are shutdown to reduce the quiescent current, only needed circuits such as protection are keep running in the light load mode. In addition, higher inductance could be used to reduce RMS losses to improve light load efficiency.

Referring now to FIGS. 1 through 9, the present invention may include a first power stage, PS1, a second power state, PS2, and a third power stage, PSX electrically controlled by a power management integrated circuit (PMIC). The PS2 and the PSX sends sensed current back to the PMIC controller, while the PS1 does not sense current and therefore no current information is fed back to the PMIC. No current sense circuit is needed or active in PS1, therefore its quiescent current could be substantially reduced in light loading. PS2 and PSX are actively driven by PMIC in non-light load conditions.

The present invention embodies a multiphase converter having a number of parallel power stages that drive a common load. By phase shifting the control signals to the converter power stages the multiphase converter provides several advantages over a single power stage including lower current ripple and higher system efficiency.

PS1 with no current sense is dedicated to support light load, wherein PS1 does not provide sensed current information back to PMIC controller. PS1 is necessary. PSX is optional. An inductor L1 paired with PS1 could be optimized to further improve light load efficiency.

PS1, PS2 and PMIC could be integrated inside one package to make it work better. Regardless of configuration, PS1 does not sense current and therefore substantially reduces quiescent current to improve light load efficiency.

A method of using the present invention may include the following. One or more of the configurations disclosed in the Figures may be implemented, wherein the current sense circuit is disabled or eliminated in PS1 to reduce quiescent current to improve light load efficiency.

Also, the present invention can be used to provide a multiphase voltage regulator for battery powered systems.

As used in this application, the term "about" or "approximately" refers to a range of values within plus or minus 10% of the specified number. And the term "substantially" refers to up to 90% or more of an entirety. Recitation of ranges of values herein are not intended to be limiting, referring instead individually to any and all values falling within the range, unless otherwise indicated, and each separate value within such a range is incorporated into the specification as if it were individually recited herein. The words "about," "approximately," or the like, when accompanying a numerical value, are to be construed as indicating a deviation as would be appreciated by one of ordinary skill in the art to operate satisfactorily for an intended purpose. Ranges of values and/or numeric values are provided herein as examples only, and do not constitute a limitation on the scope of the described embodiments. The use of any and all examples, or exemplary language ("e.g.," "such as," or the like) provided herein, is intended merely to better illuminate the embodiments and does not pose a limitation on the scope of the embodiments or the claims. No language in the specification should be construed as indicating any unclaimed element as essential to the practice of the disclosed embodiments.

In the following description, it is understood that terms such as "first," "second," "top," "bottom," "up," "down," and the like, are words of convenience and are not to be construed as limiting terms unless specifically stated to the contrary.

It should be understood, of course, that the foregoing relates to exemplary embodiments of the invention and that modifications may be made without departing from the spirit and scope of the invention as set forth in the following claims.

What is claimed is:

1. A multiphase power converter comprising:
a power management integrated circuit disposed within a single package;
a source-only voltage regulator integrated within the single package and configured to directly source a load current through a first inductor to a common output node during a light-load condition, wherein the first inductor is connected between a terminal of the single package and a current source, and wherein the current source is connected between the common output node and ground; and
a plurality of power stages located external to the single package and configured to supply additional load current during a non-light load condition, wherein each of the plurality of power stages comprises:
a current sense circuit configured to generate a feedback signal based on an output of the power management integrated circuit and only upon receiving an enable signal; and
a stage selection circuit configured to generate the enable signal to each of the plurality of power stages, and wherein in the light load condition, the enable signal is not sent to the current sense circuit of one of the plurality of power stages.

2. The multiphase power converter of claim 1, wherein:
the power management integrated circuit is configured to activate the plurality of power stages during non-light load conditions.

3. The multiphase power converter of claim 2, wherein:
the power management integrated circuit is further configured to deactivate the source-only voltage regulator after activating the plurality of power stages.

4. The multiphase power converter of claim 1, wherein:
the source-only voltage regulator is fabricated on a first semiconductor die;
the power management integrated circuit comprises a main voltage regulator controller that is fabricated on a second semiconductor die; and
the first semiconductor die and the second semiconductor die are co-packaged within the single package.

5. The multiphase power converter of claim 1, wherein:

the source-only voltage regulator is fabricated on a semi-conductor die, and the power management integrated circuit comprises a main voltage regulator controller that is fabricated on the same semiconductor die within the single package.

6. The multiphase power converter of claim 1, wherein:

the source-only voltage regulator has a lower quiescent current than each of the plurality of power stages.

7. The multiphase power converter of claim 1, wherein:

the first inductor has an inductance value greater than an inductance value of a second inductor associated with each of the plurality of power stages located external to the single package.

8. The multiphase power converter of claim 7, wherein:

the inductance value of the first inductor is selected to reduce a root mean square current value at the common output node, thereby improving light-load efficiency.

9. The multiphase power converter of claim 1, wherein:

the source-only voltage regulator comprises an amplifier.

10. The multiphase power converter of claim 9, wherein:

a first input terminal of the amplifier is configured to receive a reference signal; and a second input terminal of the amplifier is connected to the terminal of the single package.

11. The multiphase power converter of claim 10, wherein:

the power management integrated circuit is configured to provide the reference signal to ensure a proper sequence and power allocation for the source-only voltage regulator and the plurality of power stages.

12. The multiphase power converter of claim 1, wherein:

the source-only voltage regulator is a self-regulated voltage regulator with a built-in output current limit.

13. The multiphase power converter of claim 12, wherein:

a regulated voltage provided by the source-only voltage regulator is lower than a regulated voltage provided by the plurality of power stages.

* * * * *